Oct. 17, 1950  J. B. WHITMORE ET AL  2,526,441
PRODUCTION COUNTER HAVING COUNT
PREDETERMINING CONTROL MEANS
Filed July 5, 1940  3 Sheets-Sheet 1
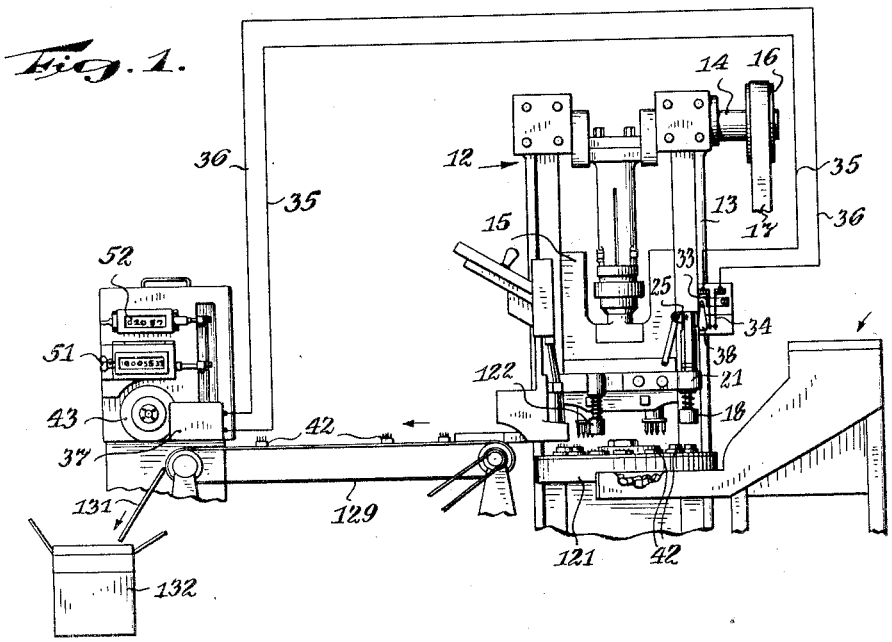
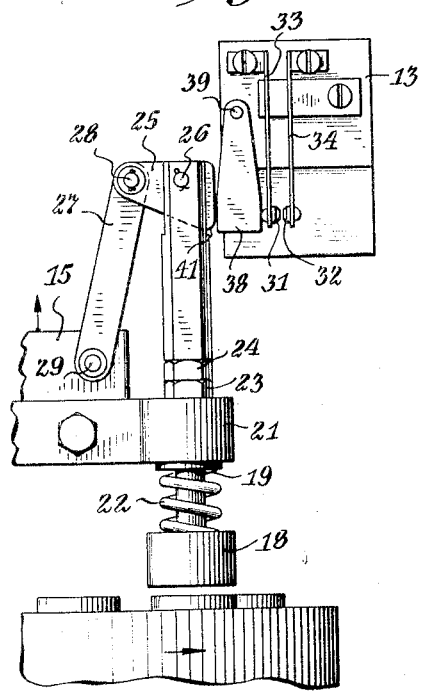
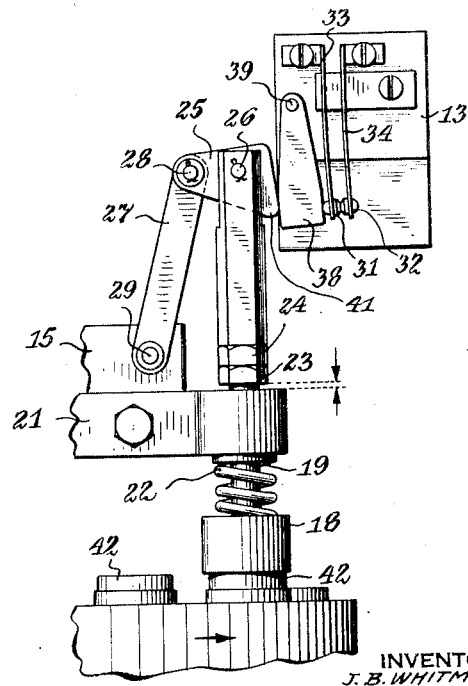
INVENTORS
J. B. WHITMORE
F. A. NEWCOMBE
W. MAKENNY
BY
ATTORNEY Oct. 17, 1950

J. B. WHITMORE ET AL  
PRODUCTION COUNTER HAVING COUNT  
PREDETERMINING CONTROL MEANS 2,526,441

Filed July 5, 1940

INVENTORS  
J. B. WHITMORE  
F. A. NEWCOMBE  
W. McKENNY  
BY  
ATTORNEY

Oct. 17, 1950
J. B. WHITMORE ET AL
PRODUCTION COUNTER HAVING COUNT
PREDETERMINING CONTROL MEANS
2,526,441
Filed July 5, 1940
3 Sheets—Sheet 3
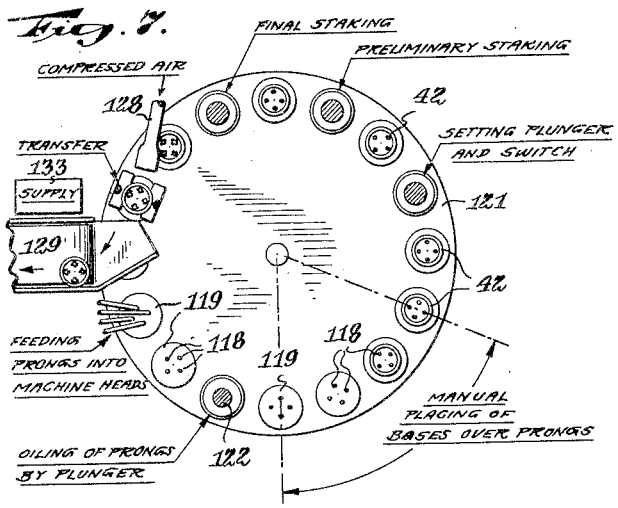
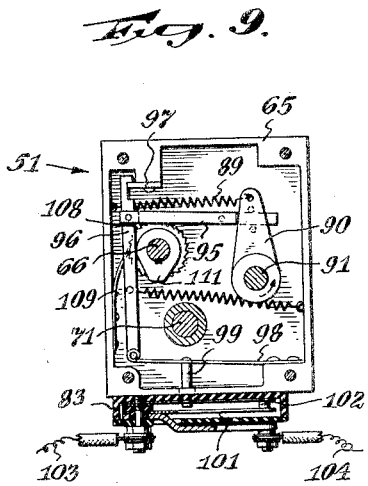
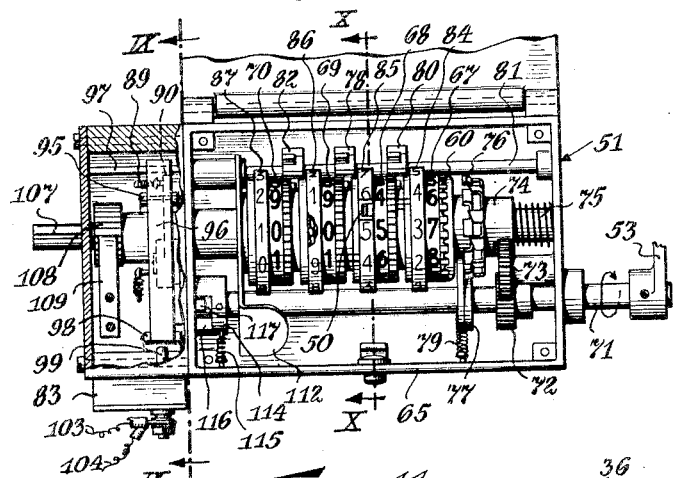
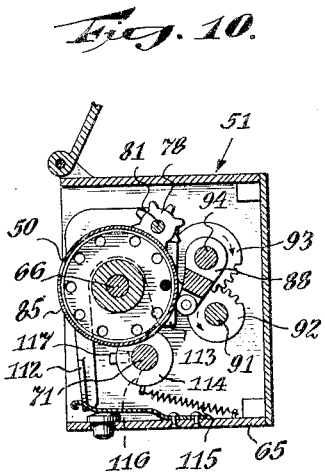
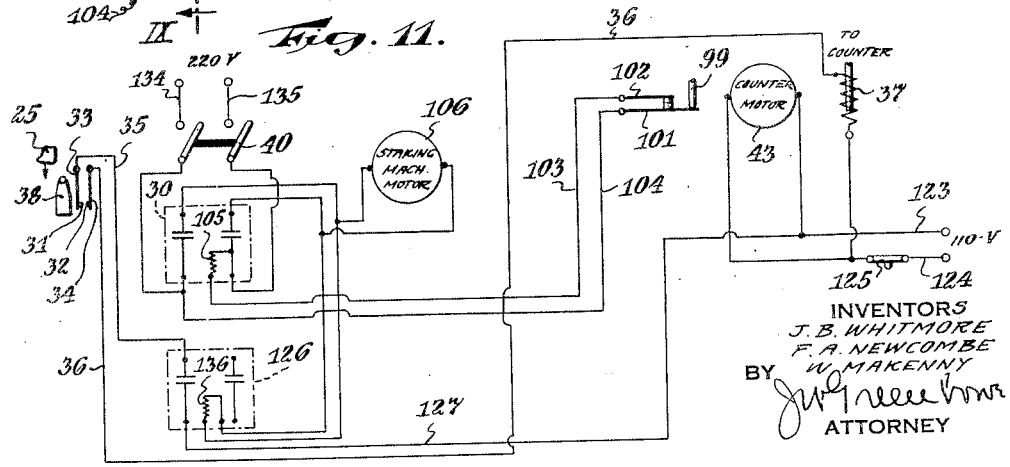
INVENTORS
J. B. WHITMORE
F. A. NEWCOMBE
W. MAKENNY
BY
ATTORNEY Patented Oct. 17, 1950

2,526,441

UNITED STATES PATENT OFFICE 2,526,441

PRODUCTION COUNTER HAVING COUNT PREDETERMINING CONTROL MEANS

James B. Whitmore, Bloomfield, Frank A. Newcombe, Nutley, and William Makenny, Mountain View, N. J., assignors to Westinghouse Electric Corporation, East Pittsburgh, Pa., a corporation of Pennsylvania Application July 5, 1940, Serial No. 344,028

18 Claims. (Cl. 235—92)

This invention relates to a method and apparatus for counting articles, and more particularly to means for counting radio tube bases as they are manufactured.

The principal object of our invention, generally considered, is to provide counting means for attachment to a machine for making articles, in order to replace a counting scale formerly employed, and make it possible to at all times know how many of said articles have been manufactured, as well as provide for automatically arresting said machine when a predetermined number of articles have been fed to a standard package.

Another object of our invention, is the provision and means for automatically determining the number of articles produced on a machine throughout the day, and especially during each shift.

A further object of our invention is to provide for standardizing each package of manufactured articles by automatically counting each article that goes into it.

An additional object of our invention is to provide for counting articles as they are manufactured in a machine, and at the same time allow for replacing defective articles without affecting the count.

Another object of our invention is the provision of a counting motor which runs continually, and a solenoid which operates a clutch to connect the motor to the counter when energized upon the passage of an article through a machine.

A further object of our invention is the provision of means for counting articles manufactured on a machine, comprising a cam which closes a circuit only each time an article being manufactured passes by a certain part of the machine, whereby said circuit energises a solenoid to cause the operation of mechanism for activating a counter to register said article.

A still further object of our invention is the adaptation of a machine which manufactures articles for automatically registering each article as it passes therethrough, by causing the relative motion, between an actuating ram and a plunger resiliently connected thereto, when said plunger engages an article being manufactured, to close an electrical circuit and cause a mechanical counter to be activated.

An additional object of our invention is to stop the operation of a machine when a predetermined number of articles being manufactured thereby have passed therethrough, by connecting a "predetermine" counter so that when the same has registered the "predetermined" number of articles, it will open the operating circuit to the means driving said machine.

Other objects and advantages of the invention, relating to the particular arrangement and construction of the various parts, will become apparent as the description proceeds.

Referring to the drawings illustrating our invention:

Figure 1 is an elevational view of mechanism embodying our invention, comprising counting mechanism associated with a machine for staking radio tube bases.

Figure 2 is an enlarged fragmentary elevational view of a portion of said staking machine, showing an electrical contact device and cam means for actuating the same.

Figure 3 is a view corresponding to Figure 2, but showing the position of the parts when a base is engaged by a plunger, causing closure of the contact device in order to effect actuation of the counting mechanism.

Figure 7 is a plan of the conveyor or turn table of the machine shown in Figure 1.

Figure 8 is an elevational view of the predetermine counter with its lid open.

Figures 9 and 10 are sectional views on the correspondingly numbered lines of Figure 8.

Figure 11 is a wiring diagram showing how the counters are operated from the staking machine.

Figure 4:
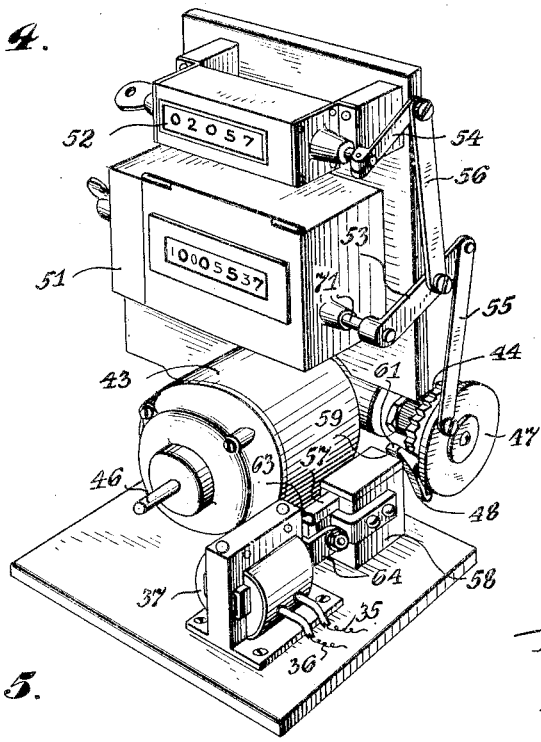
Figure 4 is an enlarged perspective view of the counting and actuating mechanism.

It was formerly the practice to standardize packages of articles, such as radio tube bases, by weight, using a "counting" scale. Such a scale was not entirely satisfactory from the standpoint of either the manufacturer or the customer, as the actual quantity of bases per package was apt to be more or less than the nominal number which the package was supposed to contain. Also this method of standardizing packages was slow and costly.

It was further desirable to have some means of determining production effective throughout the day, and especially at the end of each shift.

In order to accomplish these desired results, we made up special counter units and connected them to the staking machine for radio bases, so that as each base is engaged by a plunger on said machine, certain mechanism was caused to register that particular base on a "predetermine" as well as on a totalizing counter, in a manner which will now be explained in detail.

In the drawings, the reference character 12 (Figure 1) represents a radio base staking machine, although it will be understood that our invention may be adapted for any kind of machine which makes articles, and especially machines for making articles at high speed.

The machine 12, comprises a frame 13, in which is journalled a crank shaft 14, causing a ram 15 to reciprocate vertically in suitable guides, and carrying a pulley 16 driven by a belt 17, or other driving means, from a suitable source of power.

The machine 12 of the present embodiment, has a number of plungers operated from said ram 15, that is, there is a plunger which oils the radio tube base prongs after the same have been delivered to a head of the machine, then, after the base has been positioned over said prongs, there is another plunger which sets the prongs thereinto, another which effects preliminary staking of said prongs, and a fourth which effects the final staking. Although we may use any one of the second, third and fourth plungers for effecting a counting operation, we have selected the second plunger, or that which sets the prongs in the base, for "counting" said base, because it is most conveniently located on the machine.

Referring now to Figures 2 and 3, we have shown in detail the connection between the setting plunger 18 and the ram 15. It will be seen that said plunger 18 is mounted on a guide rod 19, which reciprocates in a guide 21 traveling with the ram 15, and is resiliently urged to its lowermost position by a coil spring 22, downward movement, however, being limited by suitable means, such as nut 23 held in adjusted position by lock nut 24.

The upper end of the guide rod 19 has pivoted thereto a cam 25 as by means of a pin 26. The inner end of said cam 25 has pivoted thereto, a diagonally extending connecting rod 27, as by means of pin 28, the lower end of said rod being pivoted to the ram 15, as indicated at 29.

Mounted on the frame 13 are a pair of contacts 31 and 32, respectively carried by springs 33 and 34, secured to said frame, and normally spaced a slight distance apart, as indicated at Figure 2, so that the circuit through lines 35 and 36 to counter-actuating solenoid 37 is normally open. These contacts could be closed by direct engagement of the cam 25, but in order to simplify the problem of insulation, they are desirably indirectly operated by an insulating switch lever 38, pivoted to the frame, as indicated at 39, and adapted for operative engagement by the outer lower corner portion 41 of the cam 25, when said cam is tilted to the position indicated in Figure 3 by the plunger 18 engaging a base 42 therebeneath, and arresting movement of the same prior to the end of the downward movement of the ram 15, whereby the connecting rod 27 pulls down on the inner end of the cam 25, and moves the outer lower corner portion 41 into engagement with the switch lever 38 to cause it to swing to the right, as viewed in Figure 3, and effect engagement between the contacts 31 and 32, closing of the circuit through lines 35 and 36, and energization of the solenoid 37.

The counter-actuating mechanism, initiated by the solenoid 37, includes a continually running motor 43 driving a ratchet wheel 44 keyed on the shaft 45, which may extend from reduction gearing between it and the armature shaft 46 on said motor. (See Figs. 1, 5 and 6.) The ratchet wheel 44 is disposed adjacent a drive disk 47 carrying a pawl 48, urged by a spring 49 into operative engagement with the ratchet wheel 44, in order to cause the motor 43 to drive the disk 47, and through it a "predetermine" counter 51 and a totalizing counter 52, as by means of counter-actuating arms 53 and 54, and associated connecting rods 55 and 56.

Unintentional actuation of the drive disk 47 and associated mechanism is, however, prevented by the solenoid stop device 57, reciprocable in a block 58, and having its end 59 reduced in section and normally stopping the operation of the drive disk 47 by engaging the angularly extending end portion 61 of the pawl 48, and pulling the opposite angular or shouldered end portion 62 from engagement with the associated ratchet 44.

Figure 5:
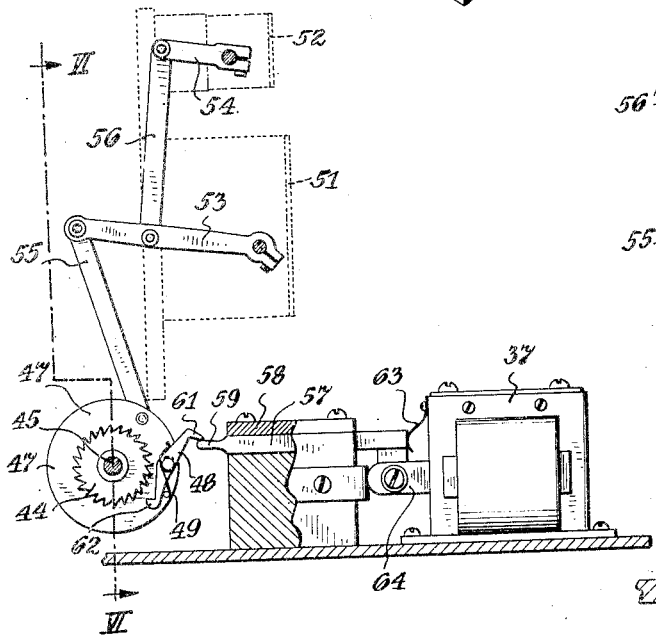
Figure 5 is a fragmentary view of the counter-actuating levers, clutch and initiating solenoid, partly in section on the line V—V of Figure 6, in the direction of the arrows.
Figure 6:
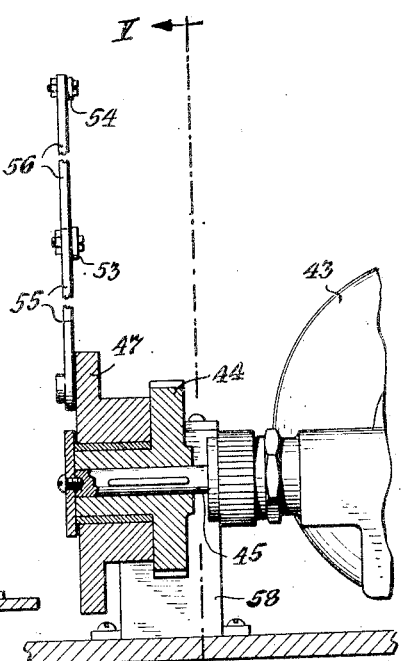
Figure 6 is a fragmentary sectional view, partly in section on the line VI—VI of Figure 5, in the direction of the arrows.

The stop member 57 is normally held in the position illustrated in Figure 5, by leaf spring 63, for the purpose of preventing the rotation of the wheel 47. When, however, the solenoid 37 is energized by closing the circuit through the contacts 31 and 32, its armature 64 is retracted to pull the reduced end portion 59 of the member 57 from engagement with the hook portion 61, to allow the spring 49 to move the pawl 48 into operative engagement with the ratchet 44 and cause the drive disk 47 to be turned one revolution by the motor 43, or until it comes back again to where the end portion 61 is again engaged by the released stop member 57.

The "predetermine" counter 51 is constructed as shown in detail in Figures 8, 9 and 10. It comprises a housing 65 in which is mounted a shaft 66, carrying a series of toothed counting wheels 67, 68, 69 and 70, said wheels carrying numbers from 0 to 9 on their peripheries and being those for respectively recording the units, tens, hundreds, and thousands.

In the present embodiment the counting wheels are actuated by the arm 53, through shaft 71, pinion 72 thereon, idler 73 and pawl-acting wheel 74, having beveled prongs urged by the spring 75 between the castellations of the ratchet member 76, which has projections 60 interlocking with teeth on the unit counting wheel 67. Undesired reverse movement of the ratchet member 76 is prevented by the pawl 77 carried on the shaft 71 and urged into engagement therewith by the spring 79. When the wheel 67 has made a complete revolution, the wheel 68 is moved up one number through the interlocking toothed wheel 80, which turns on supporting shaft 81. The toothed wheels 78 and 82 respectively interlock the wheels 68 and 69, and 69 and 70.

The number which the counter 51 will register before it breaks the circuit through its associated switch 83, is determined by the relative positions of "predetermine" wheels 84, 85, 86, and 87, which are larger in diameter and carry numbers corresponding with, but running in a direction reverse to, the numbers on the associated wheels 67 to 70, inclusive. The wheels 84 to 87, inclusive, are adjustable in respect to the counting wheels 67 and 70, inclusive, upon moving them against spring pressure to the right, as viewed in Figure 8, to telescope them about, and unlatch them from, the associated wheels, when they can be turned until the desired relationship between the numbers on said associated wheels is obtained.

In other words, if it is desired to set the counter 51 so that it will allow a thousand bases to pass the "setting" plunger 18, before it opens the switch 83, then the zeros on the wheels 84, 85 and 86, register with those on the associated wheels 67, 68 and 69, while the number "1" on the wheel 87 registers with the zero on the wheel 70. In other words, to predetermine a number, that number is set on the "predetermine" wheels when the number wheels 67 to 70, inclusive, are at zero. Said number wheels then have to be rotated until the "predetermine" wheels go back to zero, whereupon the switch 83 will be opened and the machine stopped in a manner which subsequently will be decribed.

Each "predetermine" wheel has a notch 50 in its peripheral portion, and said notches aline with one another for the purpose of allowing clockwise movement of the circuit-opening device 88, only when said wheels all show zero from the front, or when the predetermined number has been counted by a suitable number of turns of the number wheels 67 to 70, inclusive. This is accomplished by the spring 89 acting on arm 90 fixed on shaft 91, carrying toothed disk 92, the teeth of which engage corresponding teeth on the disk 93, associated on the same shaft 94 which carries circuit-opening device 88, so that when the notches 50 aline and allow the circuit-opening device 88 to turn thereinto, a corresponding movement occurs in the arm 90, which thereby pushes the connecting rod 95 to unlatch the hook rod 96 from the shoulder plate 97, and allow the spring 98 pivoted thereto, to push the associated insulating plunger 99 against the spring contact arm 101, and break the engagement between it and the associated contact device 102. This action opens the electrical circuit through the conductors 103 and 104, and breaks the circuit through the line starter solenoid 105 shown diagrammatically in Figure 11, and thus stops the staking machine motor 106.

For resetting the wheels 67 to 70, inclusive, and contacts 101 and 102, the shaft 66 has a keyway 107, adapting it to be non-rotatably received in the socket of suitable winding key or wrench key (not shown), whereby it may be turned in a counterclockwise direction, as viewed from the left of Figure 8. The ratchet 108 and pawl 109 prevent turning in the reverse direction.

Upon turning said shaft 66, the cam 111 thereon, lifts the rod 95 and the associated hook rod 96 back to the position shown in Figure 9, to thereby close the circuit through the contacts 101 and 102 and allow for restarting of the motor 106. Setting of the numbers on the disks 67 to 70 and 84 to 87, both inclusive, is allowed for by the manual release of the circuit-opening device 88, by pressing inwardly on the release lever 112, which is pivoted on the shaft 81, and has a crank arm 113 which engages said device 88 and moves it out of the notches 50 when alined.

Oscillating movement of the shaft 71 is desirably restricted by securing a collar 114 thereto, urged in a counterclockwise direction, as viewed from the right of Figure 8, by spring 115, said collar having a notch 116 receiving a lug 117, extending from the housing 65. The limited lost motion between the lug 117 and the collar 114 restricts the movement of the shaft 71 to the desired oscillating angle.

The mechanism heretofore described, may be operated as follows:

At the beginning of a shift the totalizing counter is set at zero. The machine 12 is run to accumulate a supply 133 of bases (about fifty) or other articles being manufactured. This is accomplished by having the shaft 66 so set that the contacts 101 and 102 are engaged to permit energization of the line starter solenoid 105 to close the line starter 30, which in turn energizes the solenoid 136 and closes the line starter 126 for the counter motor solenoid 37. Closing of the switch 40 starts the motor 106 which is energized from 220 volt supply lines 134 and 135 through line starter switch 30.

The totalizing counter is not touched, but the predetermine counter is set by moving the wheels 67 to 70, inclusive, back to zero and the wheels 84 to 87, inclusive, are set to the number which are to be packed in a standard shipping box.

The totalizing counter is zero at the start of a shift and is not touched until the end of the shift, at which time the reading is recorded, after which the counter is set back to zero for the next shift.

The totalizing counter is used to check hourly productions so that the superior in charge may always learn the accomplishment of each operator and machine. The record at the end of the shift is used by the office for production control purposes and is a reliable check against packed production.

Radio base prongs 118 are fed to a head 119 on the turn table 121 of the machine 12, as shown in Figure 7, from whence they are moved, say through 45°, in order to index in the proper position to be engaged upon downward movement by the prong-oiling plunger 122. The turn table, upon moving, say 22½° further, reaches the 67½° sector designated as the position for "Manual placing of bases over prongs." In this sector the operator places a base over the previously positioned prongs and said base and associated prongs are finally indexed at the position designated as "Setting plunger and switch."

Here the plunger 18 moves down to the position shown in Figure 3 and engages the base 42. The relatively greater movement of the ram 15, as compared with that of the plunger 18, swings the cam 25 counterclockwise, causing the lower outer corner portion 41 thereof to engage and swing the switch lever 38 outwardly to cause circuit-closing engagement between the contact members 31 and 32. This engagement will be found, upon reference to the wiring diagram in Figure 11, to close a circuit from the 110 volt supply line 124, through switch 125, counter solenoid 37, conductor 36, spring 34, contact 32, contact 31, spring 33, contact 35, line starter 126 for counter motor solenoid, and back to the other 110 volt supply line 123 through conductor 127.

This actuation of the solenoid 37 retracts the stop device 57, releasing the pawl 48 therefrom and allowing it to engage the ratchet 44, whereby the continually running counter motor 43, fed from the same power supply lines 123 and 124, turns the disk 47 one revolution and actuates both the "predetermine" and totalizing counters 51 and 52, to move the counting wheels thereon one unit.

Further operation of the machine 12, moves the (base or) bases to index them sequentially at positions designated "Preliminary staking," "Final staking," and then on to the position designated "Transfer," where each completed base is blown by compressed air from a pipe 128 to belt conveyor 129, whereby they are transferred through the chute 131 to packing or other receptacle 132.

In order to avoid packing imperfect bases and, at the same time, eliminate inaccuracy in the counting by removing defective bases during the inspection period while they are traveling on the conveyor 129, the supply of bases previously manufactured and passed is disposed near the conveyor, as indicated at 133. If the operator inspecting the bases on the conveyor belt 129 finds one defective, she discards and replaces it by a base from the supply 133. In this way the bases loaded in the container 132 are not only numerically correct, in accordance with the counter, but are in satisfactory condition.

When a sufficient number of bases have been engaged by the plunger 18, so that the number initially set on the "predetermine" wheels 84 to 87, inclusive, is finally registered on the counting wheels 67 to 70, inclusive, the circuit-opening device 88 moves clockwise, as viewed in Figure 10, into the aligned notches 50, releasing the hook rod 96 and causing the plunger 99 to engage the spring contact 101, and open the circuit through the lines 103 and 104. This action, as shown in the wiring diagram Figure 11, opens the circuit through the line starter solenoid 105 for the staking motor 106, allowing the line starter to open the circuit and stop the motor. This action also opens the circuit through the counter line starter solenoid 136, thereby rendering said solenoid inoperative for counting until the mechanism has been reset for making another batch of articles.

From the foregoing disclosure, it will be seen that we have provided for the accurate counting of articles, such as radio tube bases, as they pass through a staking machine, and for automatically stopping the machine when a predetermined number of said bases have been manufactured. Although we have disclosed our invention in connection with a machine for staking radio tube bases, it will be understood that our counting mechanism may be applied to any machine for making any kind of articles in which there is a movement of a part of the machine sufficient to effect a closure of electrical contacts.

It will also be seen that inaccuracies, due to the operator failing to place a base on every head of the machine, are avoided by making the machine count only when a base is actually engaged by the counting plunger 18, as the absence of a base in the position where said counting plunger acts, results in no relative movement between the ram 15 and said plunger, so that the cam 25 is not moved to effect the circuit closing engagement of the contacts 31 and 32.

Inasmuch, therefore, as only bases which actually have prongs set therein are counted, there is no inaccuracy upon the operator failing, occasionally, to place a base over prongs fed to the machine.

It will, however, be understood that, inasmuch as the counting is in a position in which the base is not completely finished, in order to be entirely accurate, the counting should be started with the indexing positions of the machine at and subsequent to the "Setting plunger" position, in the same condition at the end of the counting as at the beginning. That is, if the machine is started with bases at all the "Setting plunger" and subsequent positions, the machine should be stopped with bases at all of these positions.

Although a preferred embodiment of our invention has been disclosed, it will be understood that modifications may be made within the spirit and scope of the appended claims.

We claim:

1. Apparatus for counting articles going through a machine, comprising a frame, a ram, a plunger reciprocable with said ram and resiliently connected thereto, a cam pivoted on an upper portion of said plunger, a rod extending therefrom to said ram, contact means disposed adjacent said cam, a continually running motor, a solenoid in circuit with said contact means so as to operate when said plunger engages an article therebeneath, displace said cam and cause engagement between said contact means to energize said circuit, a counter connected through a normally inoperative clutch to said motor, and means operable by said solenoid when energized to make the clutch operative for one revolution to move the counter and count said article.

2. Apparatus for counting articles going through a machine, comprising a frame, a ram, a counting plunger reciprocable with said ram and resiliently connected thereto, a cam pivoted on the upper portion of said plunger, a rod extending therefrom to said ram, a switch lever pivotally mounted on said frame, contact means mounted on said frame adjacent said lever, a continually running motor, a solenoid in circuit with said contact means so as to operate when said plunger engages an article therebeneath, displace said cam, move said lever, and cause engagement between said contact means to energize said circuit, a counter connected through a normally inoperative clutch to said motor, and means operable by said solenoid when energized to make the clutch operative for one revolution to count said article.

3. Apparatus for counting articles manufactured by a machine comprising a cam pivoted to a movable part of said machine, means for causing movement of said cam with respect to said movable part when the latter engages an article being manufactured, in order that said cam will cause an electrical circuit to close a counter, driving means, a normally inoperative clutch between said counter and driving means, and a solenoid energized upon closing of said circuit to make said clutch operative to advance said counter one unit each time said solenoid is energized.

4. Apparatus for counting articles being manufactured in a machine, comprising a cam pivoted on a moving member of said machine, means for causing swinging of said cam when said member engages an article being manufactured, a counter, driving means, a normally inoperative clutch between said counter and driving means, a contact device closed by said cam, when so swung, to cause a flow of electricity in a circuit, and a solenoid energized by said flow to make said clutch operative to advance said counter one unit.

5. Apparatus for counting articles going through a machine comprising a cam pivoted to a moving member of said machine, a rod extending from said cam to another moving member, contact means adjacent said cam, a continually running motor, a solenoid in circuit with said contact means so as to operate as said rod moves said cam to cause engagement of said contact means when said movable member engages an article being manufactured, a counter connected through a normally inoperative clutch to said motor, and means operable by said solenoid to make the clutch operative to count each article.

6. Apparatus for counting articles going through a machine, comprising a member reciprocating in said machine and adapted to engage each article manufactured thereby, a cam pivoted to said member, a rod extending therefrom to another portion of said machine for actuating said cam when said movable member engages an article, a switch lever pivotally mounted adjacent said cam, contact means mounted adjacent said switch lever, a continually running motor, a counter connected by a normally inoperative clutch to said motor, and a solenoid in circuit with, and operable upon engagement of, said contact means when the cam is actuated to make the clutch operative for counting the engaged article.

7. Apparatus for counting articles going through and controlling the operation of a starter-controlled, motor-driven machine, comprising a pivoted cam, a counter, driving means, a normally inoperative clutch between said counter and driving means, a solenoid associated with said clutch, means for causing movement of said cam about its pivot, only when an article is actually being manufactured, to close an electric circuit through and energize said solenoid to make the clutch operative to advance the counter and register such article, a switch in the starter-operating circuit, and interlocking means between said counter and switch whereby said switch is opened when the counter has registered a predetermined number of articles.

8. Apparatus for counting articles manufactured by and controlling the operation of a starter controlled, motor driven machine, comprising a cam pivoted to a movable member of said machine, contact means adjacent said cam, means extending from said cam to another member for operating said cam to close said contact means only when said movable member engages an article being manufactured, a continually running motor, a solenoid operable upon engagement of said contact means, a counter connected by a normally inoperative clutch to said motor, operation of said solenoid placing said clutch in operative condition to allow the counter to be actuated by said motor to count each article as engaged, a switch in the starter operating circuit, and means controlled by said counter for opening said switch when said counter has registered a predetermined number of articles.

9. In combination with a machine for manufacturing articles, means pivoted to a part of said machine which moves when articles are being manufactured, means for causing rotary movement of said pivoted means and consequent closing of an electric circuit when said movable part engages an article being manufactured, power means driving said machine, a predetermine counter, said counter having an operating arm, a connecting rod for said arm, said predetermine counter comprising a series of counting disks carrying numbers, a predetermine disk associated with each of said counting disks and having numbers running in the opposite direction, each predetermine disk being adjustable with respect to the associated counting disk for setting the number of articles to be manufactured, said number being indicated by said predetermine disks when the counting disks register zero, a continually running motor, a normally open clutch between said motor and rod, and a solenoid in said circuit so as to be operable when said movable part engages an article to make the clutch effective causing operation of the counter to register said article.

10. In combination with a machine for manufacturing articles, driving means therefor, means pivoted to a part of said machine which moves when articles are being manufactured, means for causing rotary movement of said pivoted means and consequent closing of an electric circuit when said movable part engages an article being manufactured a predetermine counter, said counter having an operating arm, a connecting rod extending from said arm for operation, a continually running motor, a normally inoperative clutch between said motor and said rod, a solenoid in said circuit for controlling said clutch, whereby upon said rotary movement of said pivoted means on said machine the circuit is closed through said solenoid when an article is being manufactured, causing said solenoid to make the clutch operative for registering an article on said counter.

11. Apparatus for counting articles going through and controlling the operation of a starter-controlled motor-driven machine, comprising a frame, a ram, a plunger reciprocable with said ram and resiliently connected thereto, a cam pivoted on an upper portion of said plunger, a rod extending therefrom to said ram, contact means disposed adjacent said cam, a continually running motor, a solenoid in circuit with said contact means so as to operate when said plunger engages an article therebeneath, displace said cam, and cause engagement between said contact means to energize said circuit, a counter connected through a normally ineffective clutch to said continually running motor, means operable by said solenoid when energized to make the clutch effective for one revolution to move the counter and count said article, a switch in the operating circuit to the starter of the motor driving said machine, and means operable by the counter for opening said switch when said counter has registered a predetermined number of articles.

12. In combination with a machine for manufacturing articles, a motor for driving the same, a starter for said motor, apparatus for counting articles going through and controlling the operation of said machine, said apparatus comprising a cam pivoted to a movable portion of said machine, means extending from said cam to actuate it only when an article is actually being manufactured, a continually running motor, a counter including a normally-closed switch in the operating circuit to the starter of said machine-driving motor, a normally ineffective clutch between said counter and continually-running motor, a solenoid, a circuit for operating said solenoid including a switch closed only upon actuation of said cam, means operable by said solenoid when energized to make said clutch effective for one revolution to count each article as it is being manufactured, and means in said counter for opening said operating-circuit switch and stopping said machine-driving motor when the counter has registered a predetermined number of articles.

13. In combination with a machine for manufacturing articles, a motor for driving the same, a starter for said motor, apparatus for counting articles going through and controlling the operation of said machine, said apparatus including a normally closed switch in the operating circuit to the starter of said machine-driving motor, and means in said counting apparatus for opening said operating circuit switch and stopping said machine-driving motor when said apparatus has registered a predetermined number of articles.

14. In combination with a machine for manufacturing articles, a motor for driving the same, a starter for said motor, apparatus for counting articles going through and controlling the operation of said machine, a solenoid for making said counting apparatus effective upon the manufacture of an article, a starter for said solenoid connected in parallel with the operating circuit of said machine-driving motor, said counting apparatus comprising a normally-closed switch in the line starter circuit to said machine-driving motor, and means in said counting apparatus for opening said switch and thereby simultaneously de-energizing the starters for both machine driving motor and solenoid, when the counter has registered a predetermined number of articles, and stop said motor and counter.

15. Apparatus for counting articles going through a machine comprising a frame, a ram, a plunger reciprocable with said ram and resiliently connected thereto, a cam pivoted to said plunger, cam-operating means extending to it from said ram, a switch lever pivoted on said frame, contact means mounted on said frame adjacent said lever, driving means for said apparatus, a solenoid in circuit with said contact means so that it is energized when said plunger engages an article therebeneath and causes closing of said contact means by displacement of said cam moving said lever, a counter, a normally inoperative clutch between said counter and driving means, and means operable by said solenoid when energized to make the clutch operative for one revolution to count said article.

16. Apparatus for controlling the operation of a motor-driven machine for manufacturing articles comprising, a line starter for said motor, said starter comprising a solenoid energized upon closing a manually-controlled switch to complete the circuit to said motor, a counter connected to register the number of articles manufactured by said machine, a normally-closed switch in said solenoid circuit, and means operable by the counter for opening said normally-closed switch when said counter has registered a predetermined number of articles.

17. Apparatus for manufacturing articles comprising a frame, a ram, a plunger reciprocable with said ram and resiliently connected thereto, a cam pivotally connected to said plunger, a cam-operating rod extending therefrom to said ram, and normally open contact means disposed adjacent said cam so as to be closed each time the plunger reciprocates and engages one of said articles, displacing said plunger with respect to said ram and turning said cam.

18. Apparatus for counting articles manufactured by a machine comprising means pivoted to a part of said machine which moves when articles are being manufactured, means for causing rotary movement of said pivoted means and consequent closing of an electrical circuit when said movable part engages an article being manufactured, driving means for said apparatus, a solenoid, a counter, and a normally inoperative clutch between said counter and driving means, said solenoid being connected in said circuit so that when energized it makes said clutch operative to advance said counter one unit.

JAMES B. WHITMORE.
FRANK A. NEWCOMBE.
WILLIAM MAKENNY.

REFERENCES CITED

The following references are of record in the file of this patent:

UNITED STATES PATENTS

| Number | Name | Date |
|---|---|---|
| 1,001,409 | Jennings | Aug. 22, 1911 |
| 1,452,713 | Stortz | Apr. 24, 1923 |
| 1,616,028 | Cooney | Feb. 1, 1927 |
| 1,672,030 | Hodge | June 5, 1928 |
| 1,702,475 | Jahnig | Feb. 19, 1929 |
| 1,787,934 | Cooney | Jan. 6, 1931 |
| 1,888,533 | Jauch et al. | Nov. 22, 1932 |
| 1,957,109 | Roesen et al. | May 1, 1934 |
| 2,023,574 | Cohn | Dec. 10, 1935 |
| 2,040,025 | Slye | May 5, 1936 |
| 2,040,027 | Northrop | May 5, 1936 |
| 2,159,314 | Bliss | May 23, 1939 |
| 2,202,420 | Hamlin | May 28, 1940 |

FOREIGN PATENTS

| Number | Country | Date |
|---|---|---|
| 12,907 | Great Britain | June 4, 1907 |